April 28, 1959 J. CAPLAN 2,883,681
PILLOW CONSTRUCTION AND METHOD OF PRODUCING SAME
Filed May 13, 1957 2 Sheets-Sheet 1

INVENTOR.
Joseph Caplan

April 28, 1959   J. CAPLAN   2,883,681
PILLOW CONSTRUCTION AND METHOD OF PRODUCING SAME
Filed May 13, 1957   2 Sheets-Sheet 2
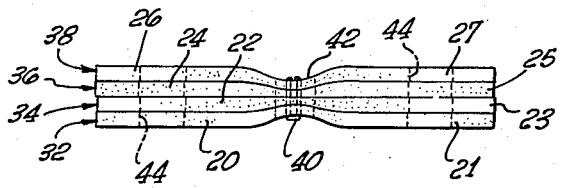
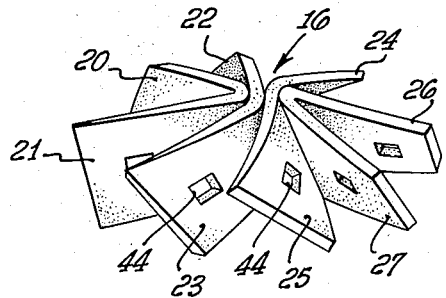
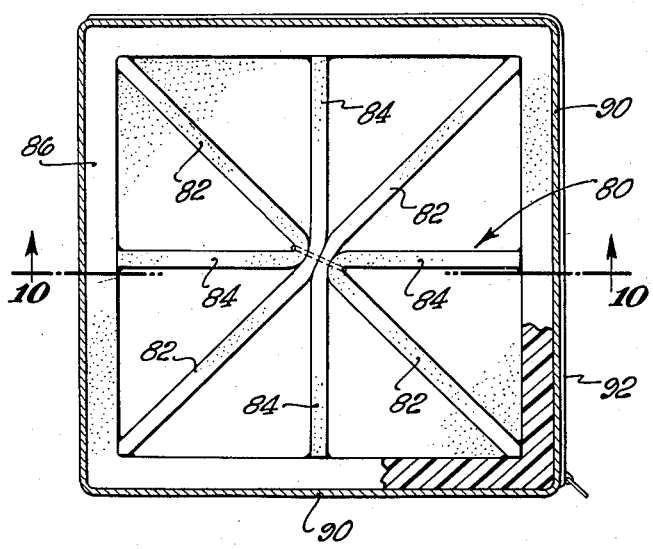
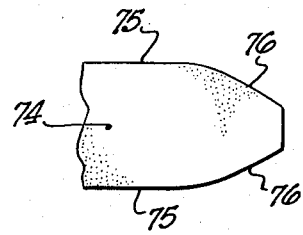
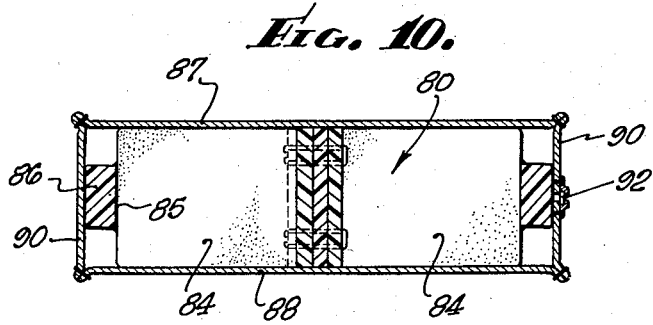
INVENTOR.
Joseph Caplan United States Patent Office 2,883,681
Patented Apr. 28, 1959

2,883,681

PILLOW CONSTRUCTION AND METHOD OF PRODUCING SAME

Joseph Caplan, Van Nuys, Calif., assignor to Shelly's Mfg. Co., Los Angeles, Calif., a corporation of California Application May 13, 1957, Serial No. 658,548

14 Claims. (Cl. 5—341)

This invention relates to a novel pillow construction, and is particularly concerned with a pillow having a unique inner structure and with a method for fabricating said pillow.

Throw pillows used for decorative purposes, sofa pillows, and the like, have been constructed of foam rubber. In constructing pillows of this nature, two similar pillow half portions are generally formed by a molding operation. These two symmetrical half portions are then placed together in abutting face to face relation, and a pair of thin sheets are placed on top and bottom of said assembly and connected together to form the pillow, the said assembled half portions constituting the inner structures of the pillow.

A new material called plastic foam has now been introduced for commercial use. This newly available material is high versatile and is presenting finding a wide variety of applications. A well known type of plastic foam now being marketed is composed, for example, of a polyurethane type material. In many respects the properties of plastic foam are different from those of foam rubber, often requiring considerably different techniques for its employment. In the first place, the resiliency or the response of plastic foam on application of pressure and release thereof is different from that of foam rubber, the latter exhibiting a substantially uniform response in this respect whereas plastic foam has a non-uniform response. Also, plastic foam is unicellular and does not have a grain structure, while foam rubber possesses such grain structure. Foam rubber has poor aging qualities and tends to dry out whereas plastic foam has markedly improved properties in this respect. Further, plastic foam has greatly improved tear strength as compared to foam rubber, e.g. from about 5 to 10 times greater than foam rubber. Thus, while plastic foam exhibits many desirable characteristics for use in construction of pillows, plastic foam cannot be molded as in the case of foam rubber; hence pillows formed of plastic foam cannot be produced by the molding procedure described above when employing foam rubber. Plastic foam is also much lighter in weight than foam rubber, and also does not have any irritating effect on the skin and is non-allergic. It also can be dry cleaned.

One object of this invention is the production of pillows, preferably formed of plastic foam, e.g. of the polyurethane type, and not requiring the use of molding procedures in their manufacture.

Another object is the provision of a novel pillow construction for throw pillows, sofa pillows, and the like, having a relatively simple inner portion or insert covered by two outer layers, said inner portion being designed and positioned within such outer layers so as to impart the desired shape, firmness and resiliency to the pillow and to maintain said characteristics in usage.

Another object is to provide a novel pillow, core or insert designed to form a resilient pillow body member which is adapted for insertion within flexible outer cover members to produce said pillow.

A still further object is the construction of such inner portion or insert of the pillow from scraps of plastic foam produced in cutting and shaping sheets of plastic foam.

Yet another object is to provide novel procedure for properly positioning said inner portion or insert within the outer coverings of the pillow, and securing said outer coverings together to maintain said inner portion in proper position within the pillow during use thereof, so that the pillow does not lose its shape due to undesirable shifting of such inner portion.

Other objects and advantages of the invention will appear from the following description thereof.

The inner portion of my pillow comprises an insert in the form of a resilient apertured body member or core of a predetermined design and having a volume substantially less than the total inner volume of the pillow, said insert functioning as a built-in spring for said pillow. Such insert can be shaped into the desired configuration according to the invention, without the use of molding procedures, and is designed to impart a preselected degree of resiliency, spring or softness to the pillow. Generally, such insert comprises a series of outwardly extending radial members connected together into a suitable manner, the number of such radially extending members and their shape and dimensions depending upon the side of the pillow to be made, and its characteristics such as its outer shape and the degree of resiliency, firmness or softness to be imparted to the pillow. For example, the pillow insert may be star or wheel shaped, and constructed of a plurality of members connected together about a central hub and extending outwardly in a general radial direction from said hub. In combination with the insert there is preferably present in the inner portion of the pillow a flange or border member, such as a ring, which is positioned about said insert to aid in shaping the pillow, but said border member may be omitted if desired.

Outer sheet covers are extended over the top and bottom of the insert and are connected together at their outer peripheral edges, preferably producing partial collapse or deformation of the outwardly extending radial members of the insert, particularly adjacent their outer edges, said collapsed portions of said members producing a back pressure or spring against said outer covers to impart the desired outer curvature and firmness to the pillow. Said outwardly extending radial members of the pillow insert may be apertured, if desired, to cause said members to collapse or deform more readily when pressure is applied to the opposite sides of said members, e.g. when assembling the outer covers over the insert, to produce a pillow having a desired contour adjacent the outer periphery of the pillow.

According to a preferred mode of procedure for production of my pillow, an insert of the type described above and formed of plastic foam is placed over a circular sheet having an outer periphery of somewhat greater diameter than that of the insert, and a second similar circular sheet is positioned over the insert so that the latter is sandwiched between said sheets, which are also preferably formed of plastic foam. A flange or ring of flexible material, preferably likewise of plastic foam, is positioned about the outer periphery of the insert beyond the ends of the outwardly extending radial members thereof. The adjacent outer peripheral edges of the circular sheets or discs are then forced together against the resiliency of the radial members of said insert, and said outer peripheral edges are folded over and secured, e.g. by cementing, to each other and to said ring, which is located between and within said circular sheets. The insert is also preferably secured, as by cementing the radial members thereof, to the top and bottom sheets forming the outer covers of the pillow, to prevent displacement of the insert within the outer covers.

In this manner a pillow is produced having an inner portion or insert which resiliently abuts the inner surfaces of the outer cover sheets, causing said sheets to assume a smooth rounded shape defining the desired shape of the pillow. By increasing or decreasing the volume of the insert, that is, by changing the thickness and dimensions of its radial members, and by changing its shape, as by partial collapse of the radial members thereof, the firmness of the pillow may be varied. Also, the shape and firmness of the pillow may be varied by changing the size or thickness of the outer sheets and/or by twisting and deforming the insert during assembly of the pillow. The flange or ring to which the outer cover sheets are preferably connected aids in shaping and contouring the outer periphery of the pillow.

In another modification, the insert noted above, with the ring or flange surrounding the outer periphery of the insert and connected to the radial members thereof, can be inserted as a unit within a pillow cover formed of top and bottom sheets and a connecting circumambient wall, said insert unit constituting the resilient body of the pillow.

The invention will be more clearly understood by the description below of certain embodiments of the invention, taken in connection with the accompanying drawing wherein Fig. 1 is a plan view of a pillow according to the invention, partially broken away to show the interior construction thereof;

Fig. 5 shows a method of forming the insert shown in Figs. 1 to 4;

Fig. 6 shows the insert of Fig. 4 twisted prior to assembly of the covers;

Fig. 8 shows a modification of the pillow insert of Fig. 4;

Fig. 9 is another modified form of pillow and inner portion or insert; and

Fig. 10 is a section taken on line 10—10 of Fig. 9.

Referring to Figs. 1 to 5, numeral 10 represents a pillow according to the invention, composed of two outer sheets 12 and 14, insert 16 and peripheral flange or ring 18. All of these components are preferably composed of plastic foam, such as the polyurethane or polyether type material. A specific illustrative material of this nature is polypropylene glycol urethane.

Figure 1:
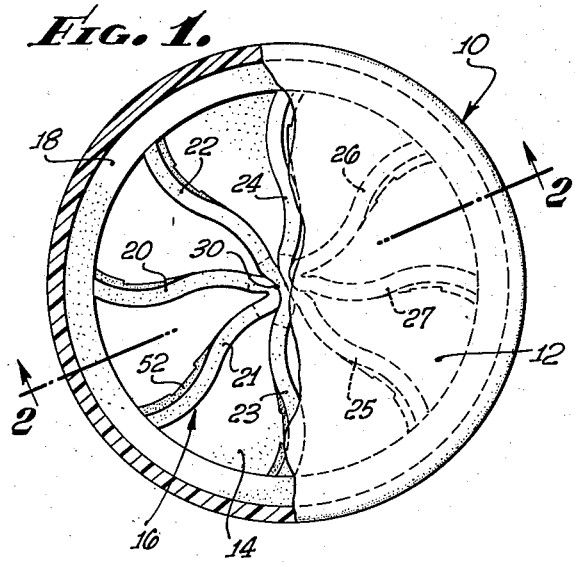
Figure 4:
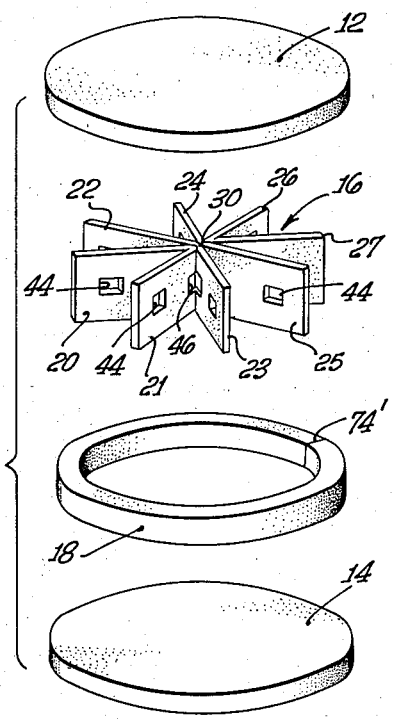
Fig. 4 is an exploded view showing the individual components of the pillow construction of Fig. 1.

Viewing particularly Figs. 1 and 4, it is seen that insert 16 is formed of a plurality, here shown as eight in number, of outwardly extending radial members 20, 21, 22, 23, 24, 25, 26, and 27, each of substantially equal length, connected to a central hub portion 30. The length of such radial members and their width or height, is dependent upon the desired diameter of the pillow, its thickness at the central portion and its contour. The thickness of each of said radial members and also to some degree, the width thereof is determined by the firmness to be built into the pillow, that is, its degree of resistance to deformation, the less such firmness the softer the pillow. Insert 16 with its radial members is conveniently formed, as shown in Fig. 5, from four plastic foam strips 32, 34, 36 and 38, mechanically stapled together as at 40 at their central portions.

The stapling of these four strips in the manner indicated compresses the strips together at their central portions as indicated at 42, due to their resiliency, and producing a central area of flexure at 42 in each of the strips, causing the outer ends of each of such strips 32, 34, 36 and 38 to bend away from the adjacent outer ends of the adjacent strip, and to separate from each other, forming the star or wheel shaped insert 16, as best seen in Figs. 1 and 4, the radial components or spokes of which form members 20 to 27. The central stapled portion of said strips forms the hub portion 30 of the insert. Thus, each of the four strips 32, 34, 36 and 38 forms two of the radial members of the insert 16. It will be seen that each of said strips has a pair of apertures 44 formed in the opposite end portions thereof, and may also have a central aperture 46. Thus, each of the eight radial members 20 to 27 formed from said four strips has an aperture 44 therein which functions to permit the end portions of such radial members to collapse or deform more readily during assembly of the pillow as described more fully below.

Figure 3:
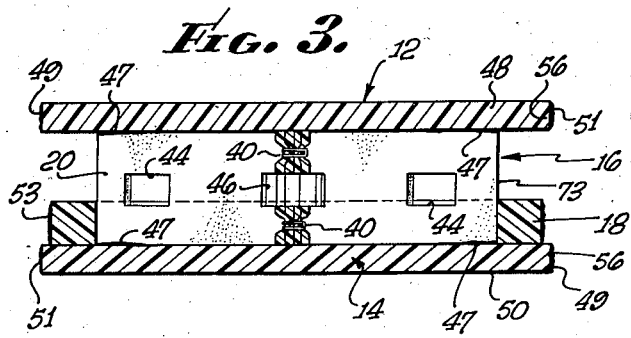
Fig. 3 is a section also taken on line 2—2 of Fig. 1, showing the relation of the parts just prior to assembly thereof.

To assemble the pillow, an adhesive, which may be a solvent type neoprene base adhesive or any other suitable type, is applied along the outer top and bottom edges of the radial members 20 to 27, as indicated at 47. The insert 16, which has a substantially smaller diameter than the outer covers or sheets 12 and 14, is positioned centrally on one of the circular sheets 14, as seen in Fig. 3. The ring 18, which may be formed from a length of plastic foam such as polyurethane and circularly positioned to form said ring, is disposed about the insert 16 on the circular sheet 14. It is noted that ring 18 has an inner diameter slightly larger than the outer peripheral diameter of the insert and an outer diameter somewhat less than the diameter of the outer circular sheets 12 and 14, which have substantially the same diameter. The other circular sheet or cover 12 is then placed on the insert in axial alignment with said insert and the lower cover 14.

A cement, e.g. of the type noted above, is then applied to the outer peripheral edges 49 of each of the covers 12 and 14, as indicated at 51, and also to the outer peripheral surface of the ring 18, as indicated at 53. The outer peripheral portion 48 of the upper cover 12 is then bent or flexed downwardly while the outer peripheral portion 50 of the lower cover 14 is flexed upwardly toward the deformed outer periphery of cover 12, in the manner shown in Fig. 2. This causes collapse or deformation of the outer ends 52 of the radial members 20 to 27 adjacent the outer peripheral portions 48 and 50 of the circular cover sheets 12 and 14, while the inner portions 54 of such radial members adjacent the centers of covers 12 and 14 remain substantially undeformed. The deformation and collapse of the outer ends 52 of the radial members 20 to 27 is aided by the presence of the apertures 44 in such members. The collapse and deformation of the outer ends of the radial members causes such members to depart from their substantially straight outwardly extending shape as seen in Fig. 4, and to assume a sort of undulating snake-like configuration as indicated in Fig. 1. If desired, further deformation of the outer ends of the radial members 20 to 27 may be imparted to the insert by axially twisting the upper portion of the insert with respect to its lower portion, as indicated in Fig. 6, just prior to flexing of the peripheral portions 48 and 50 of the covers toward each other, in order to give the desired curvature to the pillow and also to confer the desired firmness or softness on the pillow.

Figure 2:
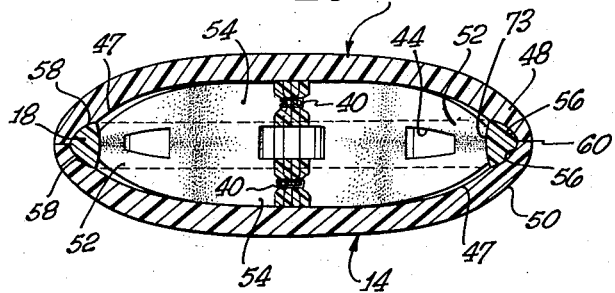
Fig. 2 is a vertical section taken on line 2—2 of Fig. 1.

When the outer peripheral portions 48 and 50 of covers 12 and 14 are deflected toward each other, ring 18 positioned about the radial members 20 to 27 and between said covers, is deformed into a substantially triangular shape, as seen in Fig. 2, by the compression of such outer peripheral cover portions against the ring. The inner portions 56 of the outer peripheral edges 49 of covers 12 and 14 are folded back over the ring 18, and the ring is cemented to the covers along the contacting surfaces of the ring and such outer peripheral edges as indicated at 58. Also a portion of the adjacent peripheral edges 49 of covers 12 and 14 are cemented together at 60. The thickness of the ring or flange 18, that is its height as viewed in Fig. 3, affects the radius of curvature of the pillow along its outer edge at the junction of the outer sheets 12 and 14. On drying of the cement, the pillow is ready for packaging and sale.

It will be seen that the insert 16, due to the resilience of its radial members 20 to 27, gives body and resilience to the pillow by tending to urge the outer covers 12 and 14 away from each other, imparting a uniformly rounded curvature to the pillow. This is aided by the ring 18, which functions to shape and give body to the outer periphery of the pillow, although if desired, said ring may be omitted. The insert 16 is held securely in position against the outer covers and is prevented from shifting therebetween; thus the pillow retains its shape even when subjected to rough usage and tossing about.

Figure 7:
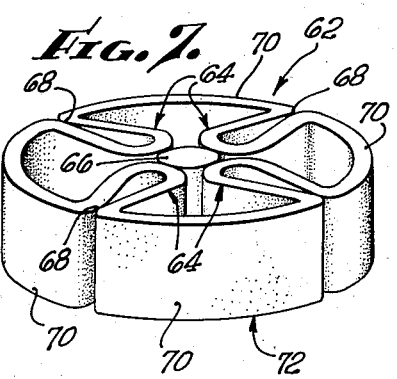
Fig. 7 shows a modified form of insert which can be employed in the invention.

A modified form of insert 62 is shown in Fig. 7. In this modification the four loops 64 in effect form four radially extending members, the inner ends of which are connected, e.g. as by cementing, to a central hub 66. The outer ends of each of the loops are connected together at 68, and the outer ends of adjacent loops are integrally connected by arcuate strips 70, the four said strips forming a ring 72 about the outer ends of loops 64. When employing insert 62 and positioning same between a pair of cover members such as 12 and 14, for producing the pillow, the use of a ring such as 18 may be dispensed with, the integral ring 72 of insert 62 functioning to shape and reinforce the periphery of the pillow.

It will be understood that while I prefer to make the pillow components herein, e.g. the insert 16, of plastic foam, e.g. of the polyurethane type, I can fabricate my pillow of other preferably resilient materials, e.g. polyvinyl chloride, foam rubber and the like, without the necessity of employing molding procedures and the expensive molds and equipment conventionally used in making pillows of foam rubber.

Further, instead of cementing or otherwise connecting the radial members 20 to 27 of the insert 16 to the top and bottom cover sheets 12 and 14, as indicated at 47 in Fig. 2, I can attach or cement the outer vertical edges 73 of such radial members to the ring 18, or to both the ring and the cover sheets. Means other than cementing can be utilized in securing the parts of the pillow together, for example glueing, welding or sewing the various components. By welding is meant heating the plastic foam material which is thermoplastic, pressing the parts together to cause a flow of the plastic composition at the contacting surfaces to seal the parts together, and then cooling.

Further, if desired, the insert 16 can be formed in a single piece, that is, made integral, instead of constructing such insert by stapling the strips together as seen in Fig. 5. Also, instead of connecting the radially extending members of the insert together at an inner central hub such as 30, the inner ends of such radial members need not be connected, but rather I may connect only the outer ends of such radial members together by arcuate strips such as 70, omitting altogether the central hub, e.g. 66.

Ring 18, in the embodiment of Fig. 4, may be formed of a single integral piece or it may be formed from a single length of material, curved to form the ring, and in the latter case the adjacent ends 74 need not be initially connected together, since the cementing of the covers 12 and 14 to such ring, as described above, will maintain it in circular form when the pillow is fabricated in the manner previously noted.

Although the insert, e.g. 16, described above is preferable deformed or collapsed at the outer ends of the radial members during its assembly within the outer cover sheets, as seen in Fig. 2, the radial members, e.g. radial member 74 of the insert of Fig. 8, may be formed so that the opposite outer edges 75 thereof are curved inwardly toward each other at their outer ends as at 76, corresponding to the pillow curvature which is desired adjacent the outer periphery thereof, and the outer cover sheets such as 12 and 14 are applied against the opposite curved edges of said radial members 74 without producing any substantial collapse or deformation of said radial members.

It is understood that I may produce pillows of a shape other than round, for example square, rectangular or other shape pillows. In Figs. 9 and 10 as shown a modification in the form of an insert 80 formed of radially disposed members, the diagonally extending radial members 82 being longer than the other radial members 84 so that the members 82 will extend into the corners of a square pillow as seen in Fig. 9. Insert 80 has a flange or collar 86 centrally surrounding and attached, e.g. as by cementing at 85, to the outer ends of radial members 82 and 84. The unit composed of insert 80 and ring 86, may be inserted within square pillow covers 87 and 88 connected by a circumambient wall 90 having a slide fastener opening 92 disposed about said wall for insertion of said unit within the covers 87 and 88, as indicated in Fig. 10. It will be noted that in the modification of Fig. 10, the ring 86 is not deformed and the insert 80 fits more or less loosely within the covers 87 and 88 and wall 90. The pillow core unit composed of members 80 and 86 shapes and forms the resilient inner body portion of the pillow.

The flange or border member such as rings 18 (Fig. 4) and 86 (Fig. 9) has a shape corresponding to the peripheral contour of the pillow, and may be round, square, rectangular or any other shape conforming to the desired shape of the pillow. Such flange may be continuous or it may be in the form of discontinuous members such as 70 in Fig. 7, and forming a general border member, or it may be formed of a series of segments about only a portion of the radial members of the insert, instead of about all of said inserts as shown in Fig. 1.

An important advantage of my pillow construction is that the various components thereof, such as the outer covers 12 and 14, the resilient insert 16 and the ring 18 may be formed economically from scraps of plastic foam or equivalent material, which otherwise would be discarded as waste.

While I have described particular embodiments of my invention for the purpose of illustration, it should be understood that various modifications thereof may be made within the spirit of the invention and set forth in the appended claims.

I claim:

1. A pillow construction which comprises a resilient inner portion comprised of a plurality of outwardly extending resilient radial members, said radial members being connected together, a pair of flexible outer covers, each of said covers being positioned over and in contact with the opposite radially extending edges of said radial members, said covers being connected together at their adjacent outer peripheral edges and securing said inner portion within said covers, the outer ends of said radial members being deformed between said covers.

2. A pillow construction which comprises a resilient inner portion comprised of a plurality of outwardly extending resilient radial members, said radial members being connected together, a pair of flexible outer covers, each of said covers extending over the opposite radially extending edges of said radial members, the outer ends of said radial members being deformed between said covers and exerting pressure against said covers, a flexible flange disposed about said radial members and between said covers, said covers being connected together adjacent their outer peripheral edges.

3. A pillow construction which comprises a resilient inner portion comprised of a plurality of outwardly extending resilient radial members, said radial members being connected together, a pair of flexible outer covers, each of said covers extending over the opposite radially extending edges of said radial members, said radial members being attached to the adjacent covers, the outer ends of said radial members being deformed between said covers and exerting pressure against said covers, a flexible flange disposed about said radial members and between said covers, said covers being connected together at their outer peripheral edges, and said flange being attached to said covers, adjacent said peripheral edges thereof.

4. A pillow which comprises a resilient insert comprised of a plurality of outwardly extending resilient radial members connected together at a central hub portion, a pair of flexible outer covers, each of said covers extending across opposite sides of said insert and positioned over and in contact with the opposite radially extending edges of said radial members, the outer peripheral edges of said covers being deflected toward each other against the outer ends of said radial members, said outer ends of said radial members being deformed by the pressure of said covers thereagainst, said covers being connected together along their adjacent outer peripheral edges and securing said insert within said covers.

5. A pillow which comprises a resilient insert comprised of a plurality of outwardly extending resilient radial members connected together at a central hub portion, a pair of flexible circular outer covers, each of said covers extending across opposite sides of said insert and positioned over and in contact with the opposite radially extending edges of said radial members, said radial members being attached to the adjacent covers, a resilient ring disposed about said radial members and between said covers, the outer peripheral edges of said covers being deflected toward each other against the outer ends of said radial members, said outer ends of said radial members being collapsed by the pressure of said covers thereagainst, said covers being connected together along their adjacent outer peripheral edges and securing said insert within said covers, and said ring being attached to said covers adjacent said outer peripheral edges thereof, and being deformed adjacent said edges, thereby shaping the pillow and reinforcing it along said outer peripheral edges.

6. A pillow as defined in claim 5, wherein said insert, said covers and said ring are each composed of plastic foam.

7. A pillow as defined in claim 5, wherein said insert is cemented to said covers, said covers are cemented together along their adjacent outer peripheral edges, and said ring is cemented to said covers adjacent said outer peripheral edges.

8. A pillow as defined in claim 5, wherein said radial members of said insert are apertured adjacent their outer ends to facilitate collapse thereof by deflection of said covers.

9. A process for assembling a pillow which comprises positioning a resilient apertured body member between a pair of flexible covers, with said covers in contact with the opposite sides of said body members, attaching said resilient body member to said covers, positioning a second flexible cover over said body member, cementing said body member to said covers, positioning a flexible flange about said body member and between said covers, deflecting the outer peripheral edges of said covers toward each other against said resilient body member and deforming the outer ends of said radial members, and connecting the outer peripheral edges of said covers to each other and to said flange.

10. A process for assembling a pillow which comprises positioning a resilient insert formed of a plurality of connected outwardly extending radial members between a pair of flexible covers, with said covers in contact with the opposite radially extending edges of said radial members, attaching said insert to said covers, positioning a flexible flange about said radial members and between said covers, deflecting the outer peripheral edges of said covers toward each other and deforming the outer ends of said radial members, folding the outer peripheral edges of said covers back against said flange and connecting said adjacent peripheral edges of said covers to each other and to said flange.

11. A process for assembling a pillow which comprises stapling a plurality of resilient strips together at their central portions and forming therefrom a resilient member comprised of a plurality of outwardly extending radial members having a central hub portion, positioning said insert on a first circular flexible cover, positioning a resilient ring about said radial members and on said cover, placing a second circular flexible cover over said insert in axial alignment with said insert and said first cover, attaching said insert to said covers, deflecting the outer peripheral edges of said covers toward each other against the action of said radial members and collapsing the outer ends of said radial members, folding the outer peripheral edges of said covers back against said ring and deforming the outer periphery of said ring, and connecting said adjacent peripheral edges of said covers to each other and to said ring.

12. A pillow, which comprises a resilient member comprised of a plurality of outwardly extending radial members having a central hub portion, a cover tightly positioned over said resilient member and deforming the outer ends of said radial members, and means connected to said radial members about the periphery thereof, for shaping the outer peripheral contour of said pillow.

13. A pillow, which comprises a resilient insert comprised of a plurality of outwardly extending resilient radial members connected together at a central hub portion, a flexible flange centrally disposed about said radial members, said flange being attached to the outer edges of said radial members, and a cover tightly positioned over said resilient insert and about said flange, said cover deforming said flange and the outer ends of said radial members.

14. A pillow construction which comprises a resilient inner portion composed of a plurality of outwardly extending resilient radial members, said radial members being connected together, a pair of flexible outer covers, each of said covers being positioned over and in contact with the opposite radially extending edges of said radial members, said covers being connected together at their adjacent outer peripheral edges and securing said inner portion within said covers, said radial members being axially twisted and the outer ends of said radial members being deformed between said covers.

References Cited in the file of this patent

UNITED STATES PATENTS

| | | |
|---|---|---|
| 1,795,304 | Howard | Mar. 10, 1931 |
| 2,785,739 | McGregor | Mar. 19, 1957 |

FOREIGN PATENTS

| | | |
|---|---|---|
| 444,624 | Germany | May 23, 1927 |
| 410,502 | Great Britain | May 14, 1934 |
| 507,484 | Great Britain | June 16, 1939 |
| 1,121,162 | France | July 24, 1956 |